(12) United States Patent
Kuo

(10) Patent No.: US 8,183,848 B2
(45) Date of Patent: May 22, 2012

(54) SWITCHING REGULATOR AND CONSTANT FREQUENCY COMPENSATING CIRCUIT FOR FIXING OPERATING FREQUENCY

(75) Inventor: Yueh-Lung Kuo, Taipei County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 313 days.

(21) Appl. No.: 12/732,219

(22) Filed: Mar. 26, 2010

(65) Prior Publication Data

US 2011/0175586 A1 Jul. 21, 2011

(30) Foreign Application Priority Data

Jan. 21, 2010 (TW) .............................. 99101641 A (51) Int. Cl.
  *G05F 1/40* (2006.01)
  *G05F 1/613* (2006.01)

(52) U.S. Cl. ......... 323/285; 323/225; 323/284; 323/288

(58) Field of Classification Search .................. 323/222, 323/225, 282–290, 351
See application file for complete search history.

(56) References Cited

U.S. PATENT DOCUMENTS

| | | | |
|---|---|---|---|
| 6,246,220 B1 | 6/2001 | Isham | |
| 6,940,189 B2 * | 9/2005 | Gizara | 307/151 |
| 7,755,341 B2 * | 7/2010 | Philbrick | 323/282 |
| 7,777,464 B2 * | 8/2010 | Jung et al. | 323/275 |
| 8,018,209 B2 * | 9/2011 | Kuo | 323/224 |
| 2009/0237048 A1 * | 9/2009 | Hou et al. | 323/282 |

OTHER PUBLICATIONS

Kuo, Title of Invention: Switching Regulator for Fixing Frequency, U.S. Appl. No. 12/566,643, filed Sep. 24, 2009.

\* cited by examiner

*Primary Examiner* — Jessica Han

(74) *Attorney, Agent, or Firm* — Winston Hsu; Scott Margo (57) ABSTRACT

A switching regulator for fixing a frequency which includes a power stage circuit, comprising an upper gate switch, a lower gate switch and an inductor; a reference voltage generator for generating a reference voltage; a comparator for outputting a comparing result according to the output voltage and the reference voltage; a constant frequency compensating circuit for a control signal according to the comparing result, a phase signal and a compensating signal. The constant frequency compensating circuit comprises a charging capacitor. The phase signal corresponding to the cross voltage of the lower gate bridge, and the compensating signal corresponding to the output voltage, and the constant frequency compensating circuit utilizes the phase signal to initialize a voltage of a terminal of the charging capacitor.

6 Claims, 5 Drawing Sheets

SWITCHING REGULATOR AND CONSTANT FREQUENCY COMPENSATING CIRCUIT FOR FIXING OPERATING FREQUENCY

BACKGROUND OF THE INVENTION

1. Field of the Invention

The present invention relates to a switching regulator and constant frequency compensating circuit, and more particularly, to a switching regulator and constant frequency compensating circuit for fixing an operating frequency according to an output voltage and a phase signal.

2. Description of the Prior Art

Power supply devices play an essential role in modern information technology. Among all the power supply devices, DC-DC (direct current to direct current) switching regulators have been widely used and are mainly utilized for providing stable DC power sources to electronic devices. Please refer to FIG. 1, which is a schematic diagram of a conventional DC-DC switching regulator 10. The DC-DC switching regulator 10 is utilized for providing a stable voltage to a load Load1, and includes an upper gate switch 100, a lower gate switch 102, a constant time trigger circuit 104, a comparator 106, an inductor L1, a capacitor C1, a reference voltage Vref1 and an inverter INV1. The constant time trigger circuit 104 outputs a pulse signal with constant active time to control operations of the upper gate switch 100 and the lower gate switch 102. Whenever the output voltage Vout1 is smaller than the reference voltage Vref1, the comparator 106 outputs a signal to the constant time trigger circuit 104, so that the constant time trigger circuit 104 outputs the pulse signal to turn on the upper gate switch 100 and turn off the lower gate switch 102. Thus, an external voltage source Vin1 supplies electric energy to the inductor L1 and then to the load Load1 via the upper gate switch 100. Since the pulse signal outputted by the constant time trigger circuit 104 has a constant active time, the upper gate switch 100 can be turned on for a constant interval when the output voltage Vout1 is smaller than the reference voltage Vref1. If the output voltage Vout1 is still higher than the reference voltage Vref1 after the upper gate switch 100 is turned on, the upper gate switch 100 would remain turned off until the output voltage Vout1 is smaller than the reference voltage Vref1. In other words, when the upper gate switch 100 is turned off, the output voltage of the DC-DC switching regulator 10 starts falling, and only when the output voltage Vout1 is smaller than the reference voltage Vref1, the upper gate switch 100 will be turned on again. In other words, the DC-DC switching regulator 10 utilizes a pulse width modulation (PWM) method to turn the upper gate switch 100 on/off, so as to regulate the power delivered to the load Load1 and thus to stabilize the output voltage Vout1.

Figure 1:
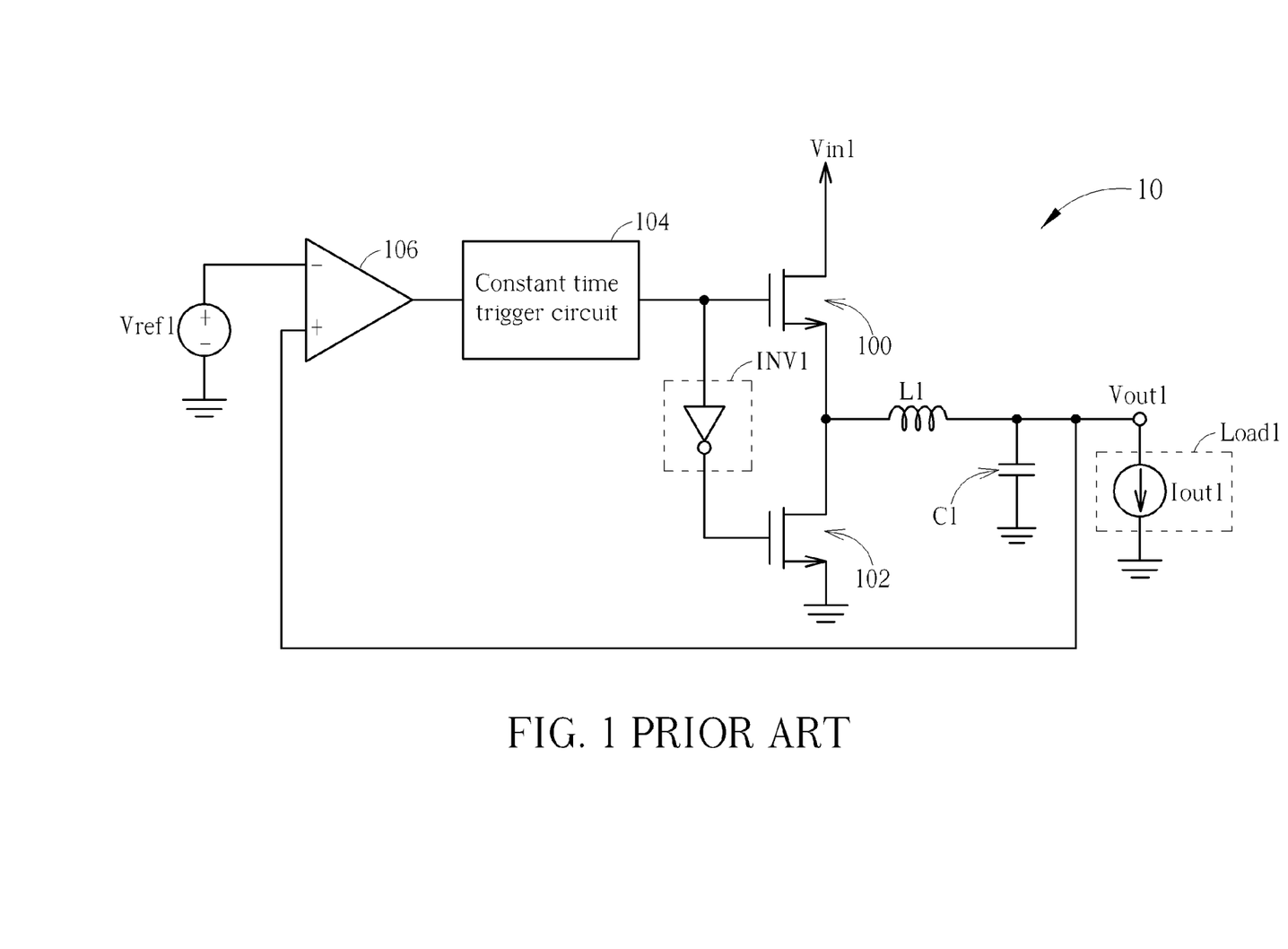
FIG. 1 is a schematic diagram of a conventional DC-DC switching regulator.

Meanwhile, since the operating period of the PWM signal is the summation of the turn-on and turn-off periods of the upper gate switch 100, when resistance of the load Load1 varies, the duty cycle of the PWM signal varies accordingly, to stabilize the output voltage. In other words, since the turn-on period of the constant time trigger circuit 104 is fixed, and only the turn-off period can be changed, it implies the operating period (or the operating frequency) of the PWM signal varies as the resistance of the output load varies. Also, operating characteristics of some components in the DC-DC switching regulator 10, such as the inductor L and the capacitor C for enhancing energy efficiency and reducing ripples, are highly related to the operating frequency of the DC-DC switching regulator 10. In other words, if the operating frequency varies within a wide range, these frequency-sensitive components cannot be optimized. In such a situation, some negative phenomena occur. For example, the ripples of the output voltage Vout1 will become too large to meet requirements of some applications, because the operating frequency varies from the optimized frequency.

Figure 2:
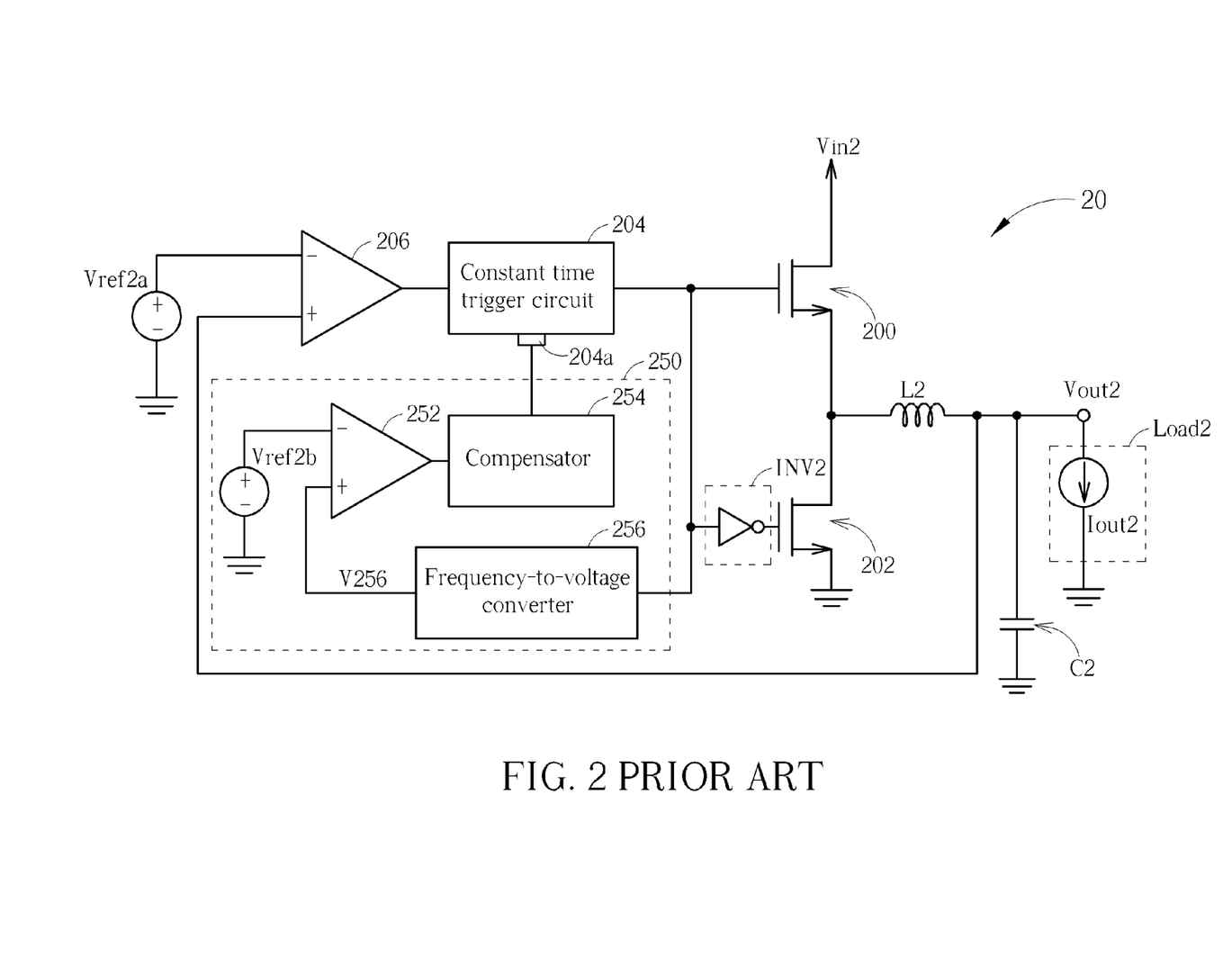
FIG. 2 is a schematic diagram of a conventional DC-DC switching regulator for fixing an operating frequency.

Please refer to FIG. 2, which is a schematic diagram of a conventional DC-DC switching regulator 20 for fixing an operating frequency. The structure of the DC-DC switching regulator 20 is different from that of the DC-DC switching regulator 10 by some components added for fixing the operating frequency. The DC-DC switching regulator 20 includes an upper gate switch 200, a lower gate switch 202, a constant time trigger circuit 204, a comparator 206, an inductor L2, a capacitor C2, a reference voltage Vref2a and an inverter INV2. Besides, the DC-DC switching regulator 20 further includes a frequency fixing circuit 250. The frequency fixing circuit 250 includes an error amplifier 252, a compensator 254, a frequency-to-voltage converter 256 and a voltage reference Vref2b. Noticeably, the constant time trigger circuit 204 further includes a control input terminal 204a and thus is not the same with the constant time trigger circuit 104. The control input terminal 204a is utilized for adjusting the turn-on period of the constant time trigger circuit 204, to fix the operating frequency. In other words, the turn-on period of the constant time trigger circuit 204 is no longer constant. In the DC-DC switching regulator 20, when the frequency tends to vary, the constant time trigger circuit 204 adjusts the length of the turn-on period according to the control signals received by the control input terminal 204a. In addition, the constant time trigger circuit 204 integrates the frequency to voltage converter 256, the error amplifier 252 and the compensator 254 into a closed control loop, such that the output voltage V256 of the frequency to voltage converter 256 can follow and fix at the reference voltage Vref2b. As a result, the operating frequency (or the operating period) of the PWM signal outputted by the constant time trigger circuit 204 can be fixed.

Since the operating frequency of the DC-DC switching regulator 20 can be fixed, the designer can optimize the designs of the frequency-sensitive components to reduce the ripples. However, in order to fix the operating frequency, the frequency to voltage converter 256, the error amplifier 252 and the compensator 254 of the DC-DC switching regulator 20 need to be implemented by more complex circuitry, causing larger chip area and higher production cost.

SUMMARY OF THE INVENTION

It is therefore an objective of the present invention to provide a switching regulator and constant frequency compensating circuit for fixing an operating frequency according to an output voltage and a phase signal.

The present invention discloses a switching regulator for fixing an operating frequency. The switching regulator includes a power stage circuit, a reference voltage generator, a comparator and a constant frequency compensating circuit. The power stage circuit is utilized for receiving an input voltage, and providing an output voltage according to a control signal. The power stage circuit includes an upper gate switch, a lower gate switch, coupled to the upper gate switch, and an inductor, coupled to the upper gate switch and the lower gate switch. The reference voltage generator is utilized for generating a reference voltage. The comparator is utilized for outputting a comparison result according to the output voltage and the reference voltage. The constant frequency compensating circuit is utilized for outputting the control signal according to the comparison result, a phase signal and a compensating signal, comprising a charging capacitor having one terminal coupled to a ground, for charging. The phase signal is corresponding to a voltage across the lower gate switch of the power stage circuit. The compensating signal is corresponding to the output voltage of the power stage circuit. The constant frequency compensating circuit utilizes the phase signal to initialize a voltage of another terminal of the charging capacitor of the constant frequency compensating circuit.

The present invention further discloses a constant frequency compensating circuit for a switching regulator. The constant frequency compensating circuit includes a charging capacitor, having one terminal coupled to a ground, for charging, a reference current source, coupled to another terminal of the charging capacitor, for providing a constant current related to an input voltage of the switching regulator to charge the charging capacitor, a comparator, including a positive terminal, for receiving a compensating signal, and a negative terminal, coupled to the another terminal of the charging capacitor, the comparator utilized for comparing magnitudes of signals of the positive terminal and the negative terminal, to output a control signal, and a switch, including a first terminal, coupled to the another terminal of the charging capacitor, and a second terminal, for receiving a phase signal, the switch utilized for conducting connection between the first and the second terminals according to the control signal. The phase signal is corresponding to a voltage across a lower gate switch of the switching regulator. The compensating signal is corresponding to an output voltage of the switching regulator. The constant frequency compensating circuit utilizes the phase signal to initialize a voltage of the another terminal of the charging capacitor of the constant frequency compensating circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
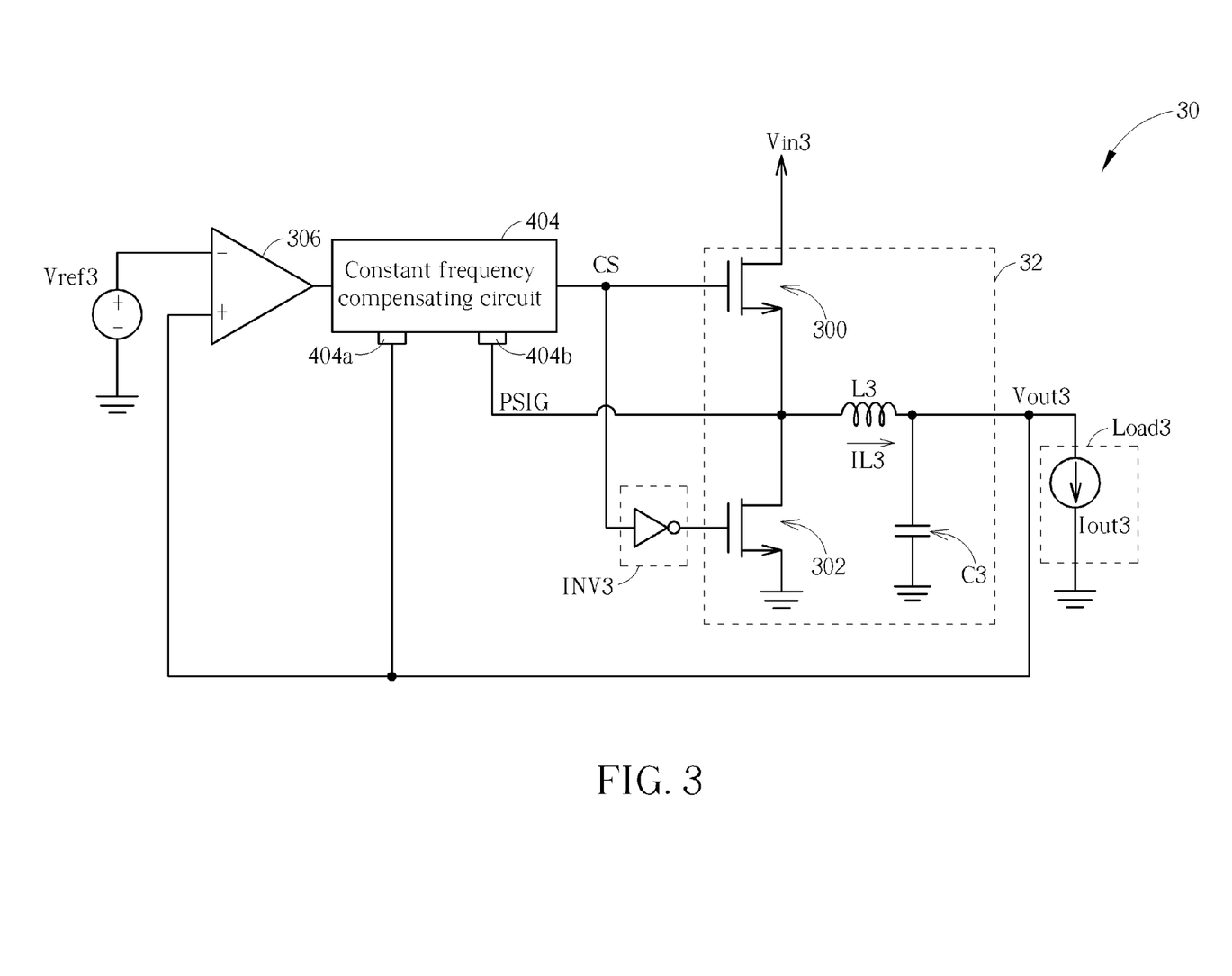
FIG. 3 is a schematic diagram of a DC-DC switching regulator according to an embodiment of the present invention.

Please refer to FIG. 3, which is a schematic diagram of a DC-DC switching regulator 30 according to an embodiment of the present invention. The DC-DC switching regulator 30 is mainly utilized for providing an output voltage Vout3 to a load Load3, and a current source Iout3 denotes the current drained by the load Load3. The DC-DC switching regulator 30 includes a power stage circuit 32, a comparator 306, a reference voltage Vref3, an inverter INV3, and a constant frequency compensating circuit 404. The power stage circuit 32 includes an upper gate switch 300, a lower gate switch 302, an inductor L3, and a capacitor C3. The most distinguished difference between the structure of the DC-DC switching regulator 30 and that of the DC-DC switching regulator 20 is: the DC-DC switching regulator 30 utilizes the constant frequency compensating circuit 404 to fix the operating frequency, and thus has a simpler structure. Besides, compared with the constant time trigger circuit 104 of the DC-DC switching regulator 10, the constant frequency compensating circuit 404 further includes a control input terminal 404a and an input terminal 404b, for receiving output voltage Vout3 and a phase signal PSIG, respectively, to adjust turn-on period of the constant frequency compensating circuit, in order to fix the operating frequency. The operating principles of the constant frequency compensating circuit 404 are illustrated as follows.

In the DC-DC switching regulator 30, the output voltage Vout3 can be derived by examining the voltage across the inductor L3, and is expressed by the following equation:

$$Vout3 = \frac{1}{Ts} \cdot \int_0^{Ton} (Vin3 - IL3 \cdot Rds1) \cdot dt + \frac{1}{Ts} \cdot \int_{Ton}^{Ts} (0 - IL3 \cdot Rds2) \cdot dt.$$

The symbols Ts, Ton, IL3, Rds1 and Rds2 denote an operating period, a turn-on period of the upper gate switch 300, an induction current, conduction resistances of the upper gate switch 300 and the lower gate switch 302, respectively. The first term on the right side of the above equation denotes an input voltage Vin3 charging the inductor L3 when the upper gate switch 300 is turned on and the lower gate switch 302 is turned off. The second term on the right side denotes the inductor L3 providing electrical energy to the load Load3 when the upper gate switch 300 is turned off and the lower gate switch 302 is turned on. The above two terms determine the magnitude of the output voltage Vout3. Besides, if the input voltage Vin3, the output voltage Vout3 and the inductor current IL3 are relatively stable, the above equation can be rearranged as the following equation:

$$Ts \cdot Vout3 = Ton \cdot (Vin3 - IL3 \cdot Rds1) + [0 - (Ts - Ton) \cdot (IL3 \cdot Rds2)]$$

By rearranging the above equation, the operating period Ts can be expressed as the following equation:

$$Ts = Ton \cdot \frac{Vin3 + IL3 \cdot (Rds2 - Rds1)}{Vout3 + (IL3 \cdot Rds2)}$$

$$= Ton \cdot \frac{Vin3}{Vout3} \cdot \frac{1 + \frac{IL3 \cdot (Rds2 - Rds1)}{Vin3}}{1 + \frac{(IL3 \cdot Rds2)}{Vout3}}.$$

According to the principles of pulse width modulation (PWM), the turn-on period Ton is determined by the output voltage Vout3 and the input voltage Vin3. In other words, the turn-on period Ton can be expressed as the following equation:

$$Ton = K1 \cdot \frac{Vout3}{Vin3}$$

where a parameter K1 denotes a constant parameter and is determined by related circuit parameters. Then, the equation for the operating period Ts can be rearranged as the following equation:

$$Ts = K1 \cdot \frac{1 + \frac{IL3 \cdot (Rds2 - Rds1)}{Vin3}}{1 + \frac{(IL3 \cdot Rds2)}{Vout3}}.$$

Typically, the parameter K1 equals 2.5 micro-second when a switching regulator operates at 400 KHz.

By closely examining the above equation, the stability and the operating frequency of the DC-DC switching regulator 30 varies as any of the inductor current IL3, the output voltage Vout3, the input voltage Vin3, the conduction resistance of the upper gate switch Rds1 or the conduction resistance of the lower gate switch Rds2 varies. According to detailed numerical simulation, the $$1 + \frac{(IL3 \cdot Rds2)}{Vout3}$$

term in the denominator of the above equation affects the stability of the operating frequency most. Therefore, according to the above equation for the operating period Ts, if the affection of the term in the denominator is removed, the operating frequency of the DC-DC switching regulator can become more stable.

Therefore, in order to stabilize the operating frequency of the DC-DC switching regulator 30, the present invention modifies the above equation of the turn-on period Ton as the following equation:

$$Ton = K1 \cdot \frac{Vout3 + IL3 \cdot Rds2}{Vin3}.$$

As can be seen from the above equation, a new term Vout3+ IL3·Rds2 in the nominator is utilized for replacing the original term Vout3 in the nominator to determine the turn-on period Ton, which is equivalent to increasing the turn-on period Ton by $$1 + \frac{(IL3 \cdot Rds2)}{Vout3}$$

times. As a result, the operating period Ts can be modified as the following equation according to the above equation:

$$Ts = K1 \cdot \left[1 + \frac{IL3 \cdot (Rds2 - Rds1)}{Vin3}\right].$$

As can be seen from the above equation, the term $$1 + \frac{(IL3 \cdot Rds2)}{Vout3}$$

in the denominator has been removed, thus significantly enhancing the stability of the operating frequency of the DC-DC switching regulator 30.

In order to realize the above operating principles, the present invention includes the constant frequency compensating circuit 404 for regulating the turn-on period Ton according to the phase signal PSIG and the output voltage Vout3. In other words, the constant frequency compensating circuit 404 can increase the turn-on period Ton by $$1 + \frac{(IL3 \cdot Rds2)}{Vout3}$$

times according to variations of the phase signal PSIG and the output voltage Vout3, so as to stabilize the output voltage and fix the operating frequency. Noticeably, the phase signal PSIG is measured at one terminal of the inductor L3 connected with the lower gate switch 302, and equals a voltage IL3·Rds2, which is also the voltage across the lower gate switch 302 when the lower gate switch 302 is turned on.

Figure 4A:
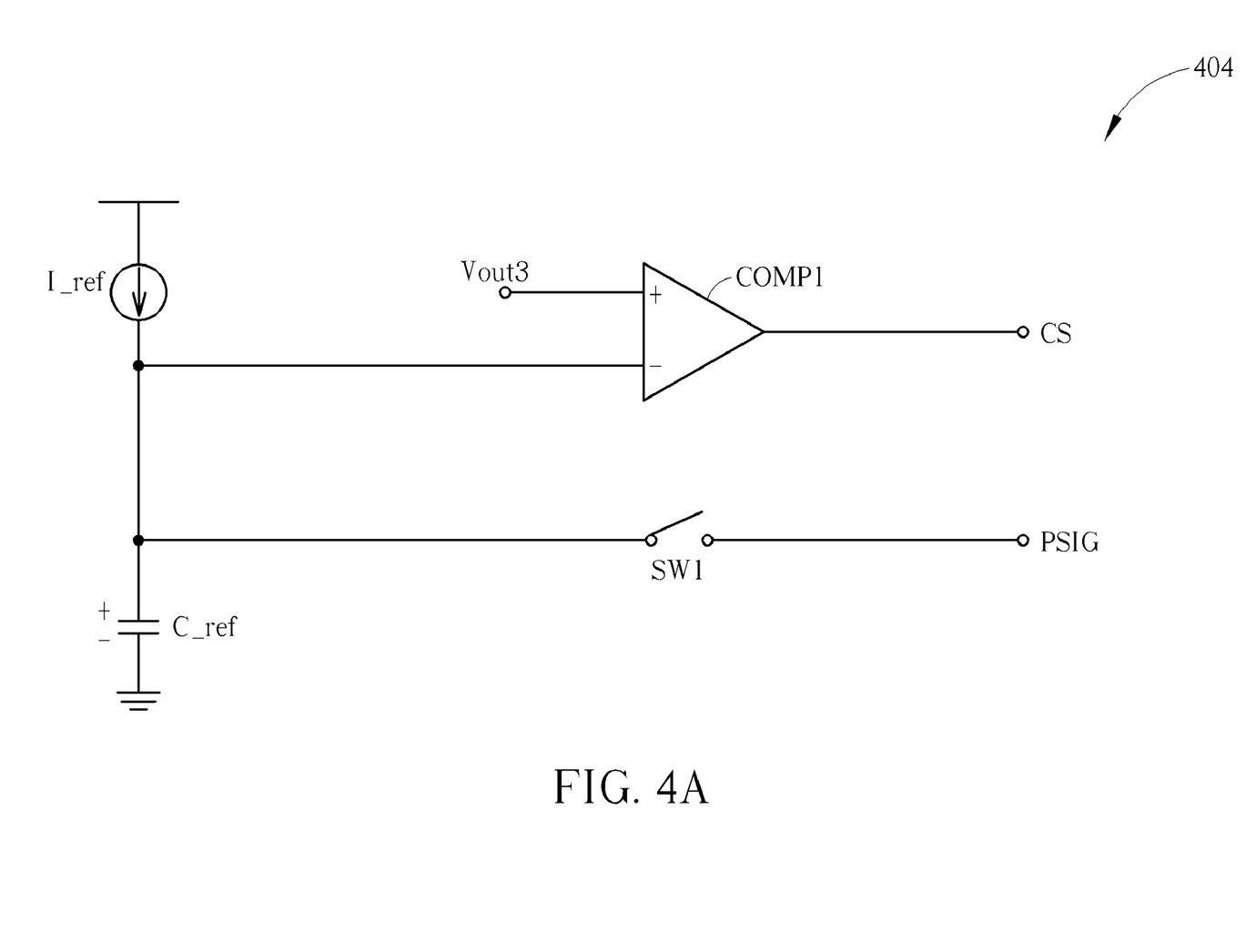
FIG. 4A and FIG. 4B are schematic diagrams of the constant frequency compensating circuit shown in FIG. 3.

Please refer to FIG. 4A, which is a schematic diagram of the constant frequency compensating circuit 404 according to an embodiment of the present invention. The constant frequency compensating circuit 404 includes a reference current source I_ref, a charging capacitor C_ref, a comparator COMP1, and a switch SW1. The reference current source I_ref is utilized for providing a constant current related to the input voltage Vin3 to charge the charging capacitor C_ref. When the upper gate switch 300 is turned off, and the lower gate switch 302 is turned on, the constant frequency compensating circuit 404 samples a voltage level of the phase signal PSIG at the moment that the switch SW1 is turned on, and takes this voltage level as a start voltage of the charging capacitor C_ref. Since the phase signal PSIG is a negative value when the lower gate switch 302 is turned on, a voltage of a positive terminal of the charging capacitor C_ref is a negative value after the phase signal PSIG is sampled, and the charging capacitor C_ref is charged from the negative voltage value. Meanwhile, the greater an absolute value of the negative voltage value is, the longer the charging capacitor C_ref is charged to a specific positive voltage, i.e. the output voltage Vout3. In other words, when the lower gate switch 302 is turned on, the greater the absolute value of the negative value corresponding to the phase signal PSIG, the greater the load current Iout3 is. Therefore, the constant frequency compensating circuit 404 needs to charge the charging capacitor C_ref longer, such that the voltage of the positive terminal of the charging capacitor C_ref can become greater than the output voltage Vout3. Based on the operating principles, the constant frequency compensating circuit 404 can increase the turn-on period Ton according to the load current Iout3. Besides, the constant frequency compensating circuit 404 utilizes the constant current provided by the reference current source I_ref to charge the charging capacitor C_ref, and utilizes the comparator COMP1 to compare the voltage of the positive terminal of the charging capacitor C_ref with the output voltage Vout3. When the absolute value of the phase signal PSIG is greater than the output voltage Vout3, the output signal of the comparator COMP1 changes a state, in order to turn the upper gate switch 300 and the lower gate switch 302 on/off, and adjust the turn-on period Ton. In addition, the switch SW1 is open (cut-off) when the lower gate switch 302 is turned off, and the switch SW1 is conducted when the lower gate switch 302 is turned on. As a result, the charging capacitor C_ref can sample the voltage level of the phase signal PSIG at the moment that the lower gate switch 302 is turned on, and starts charging. The charging capacitor C_ref can be utilized for maintaining the same voltage level with the phase signal PSIG when the lower gate switch 302 is turned on.

In short, when the system utilizes the reference current source I_ref to provide a constant current to charge the charging capacitor C_ref, the voltage across the charging capacitor C_ref increases gradually. When the voltage across the charging capacitor C_ref reaches a predefined voltage, the system utilizes the comparator COMP1 to trigger a control signal CS. The start voltage of the charging capacitor C_ref of the constant frequency compensating circuit 404 is a variable, i.e. the voltage level of the phase signal PSIG. For example, when the start voltage of the charging capacitor C_ref is smaller, i.e. a greater load current Iout3, it takes longer for the voltage of the positive terminal of the charging capacitor C_ref to reach the predefined voltage, i.e. the output voltage Vout3, causing longer charging time as well as the turn-on period Ton. On the other hand, if the start voltage of the charging capacitor C_ref value is higher, i.e. a smaller load current Iout3, the charging time as well as the turn-on period Ton is shorter. In the prior art, since the turn-on period Ton of the constant time trigger circuit 104 is a constant value, even if the resistance of the load varies, the turn-on period Ton is still constant. Thus, the operating period or the operating frequency varies as the load varies, deteriorating the system performance. In comparison, the constant frequency compensating circuit 404 of the present invention adjusts the turn-on period Ton according to the load current Iout3 based on the above principles, so as to fix the operating period or the operating frequency substantially to a constant.

Figure 4B:
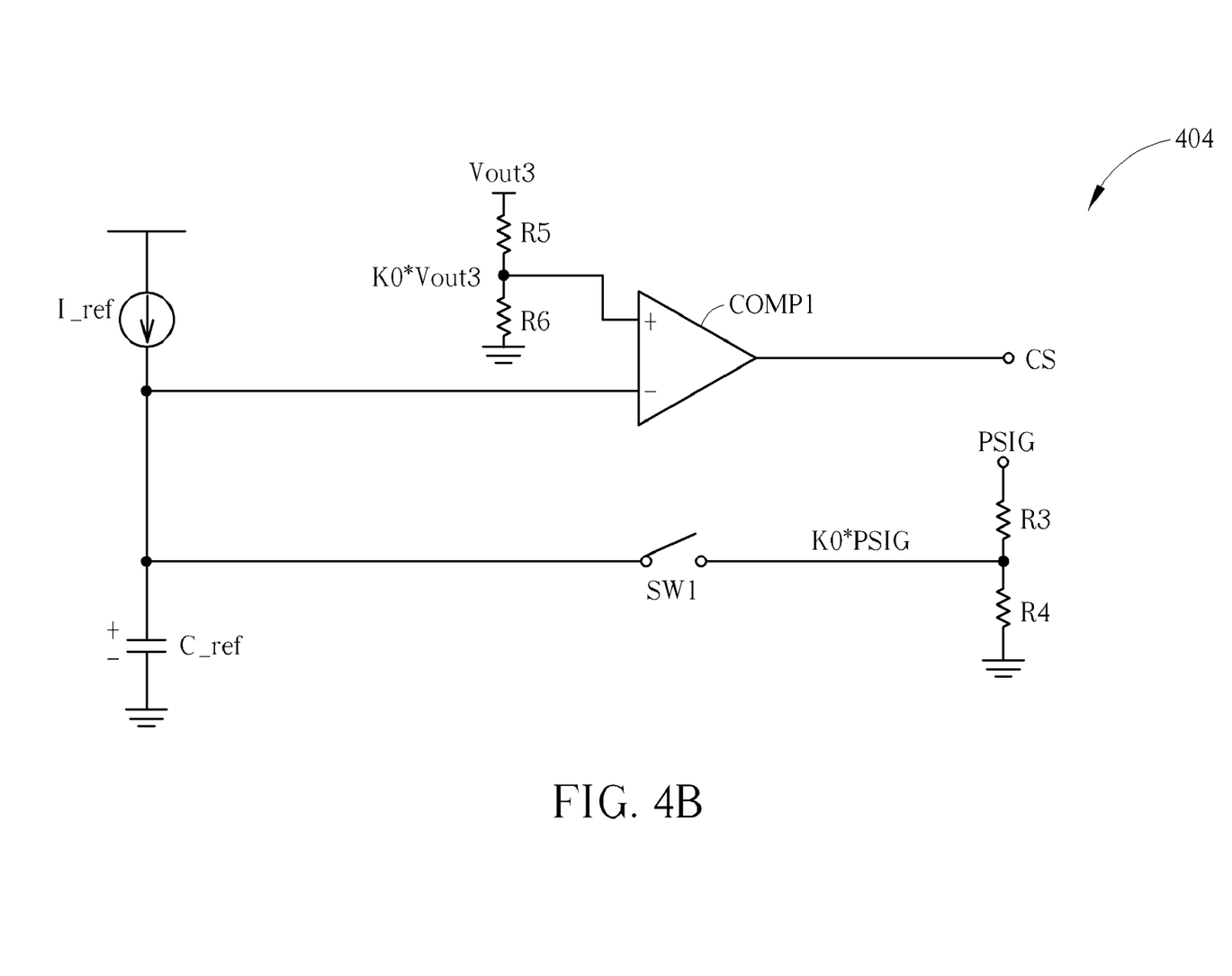

Noticeably, any voltage signal proportional to Vout3+ IL3·Rds2 can be utilized for removing the $$1 + \frac{(IL3 \cdot Rds2)}{Vout3}$$

term in the denominator and adjusting the length of the turn-on period Ton. Those with ordinary skill in the art can make modifications and alterations according to the spirit of the present invention. For example, the voltage K0·(Vout3+ IL3·Rds2) can be utilized for removing the $$1 + \frac{(IL3 \cdot Rds2)}{Vout3}$$

term in the denominator. In order to realize the extended design, please refer to FIG. 4B, which is a schematic diagram of the constant frequency compensating circuit 404 according to an alteration of the present invention. In FIG. 4B, the constant frequency compensating circuit 404 includes a reference current source I_ref related to an input voltage Vin3, a charging capacitor C_ref, a comparator COMP1, a switch SW1, and voltage dividing resistances R3-R6. In this structure, the designer can generate voltages K0·Vout3 and K0·PSIG by adjusting resistances of the voltage dividing resistances R3-R6, so as to adjust the turn-on period Ton. Noticeably, the voltage dividing resistances R3-R6 of FIG. 4B are utilized for dividing the voltage, and need to meet the constraint condition of R3/R4=R5/R6=K0. Under such a situation, the operating period Ts can be expressed as the following equation:

$$Ts = K0 \cdot K1 \cdot \left[1 + \frac{IL3 \cdot (Rds2 - Rds1)}{Vin3}\right].$$

FIG. 4B is an extended design of FIG. 4A, except for the added voltage dividing resistances R3-R6 for generating voltages K0·Vout3 and K0·PSIG, other structures and operating principles of the circuit are the same with those in FIG. 4A, and are not narrated hereinafter. Noticeably, by observing the above equation, the equation includes a constant parameter K0, and a parameter K1 related to internal circuit. The designer can adjust the above parameters (K0 or K1) according to requirements, in order to select a proper operating frequency (or period) for the regulator circuit.

In addition, since the upper gate switch 300 and the lower gate switch 302 are often realized by power transistors of the same type in many applications, resistances of the conduction resistor Rds1 of the upper gate switch 300 and the conduction resistor Rds2 of the lower gate switch 302 are close. As a result, the $$\left[1 + \frac{IL3 \cdot (Rds2 - Rds1)}{Vin3}\right]$$

term in the nominator of the above Ts equation approximates to 1, such that the operating period Ts approximates to a constant value K0·K1. Besides, even if the upper gate switch 300 and the lower gate switch 302 are not transistors of the same type, the present invention still can increase the turn-on period Ton by $$1 + \frac{(IL3 \cdot Rds2)}{Vout3}$$

times according to variations of the output voltage Vout3 and the load current Iout3, so as to stabilize the operating frequency of the system. In detail, the present invention dynamically adjusts the start voltage of the charging capacitor C_ref of the negative terminal of the comparator COMP1 (related to the phase signal PSIG) by varying the load current Iout3, so as to equivalently dynamically adjust the voltage of the positive terminal of the comparator COMP1 (related to the output voltage Vout3). Therefore, the present invention can perform frequency compensation by varying the load current Iout3.

Noticeably, except for utilizing the phase signal PSIG to obtain a voltage signal proportional to the output current, the present invention can utilize other methods to obtain signals proportional to the output current as well. For example, a sensing resistor can be added in the output current path, such that a voltage proportional to the current can be obtained by measuring a voltage across the sensing resistor. In other words, the present invention can utilize the frequency compensator 404 to receive any signal proportional to the output current for replacing the phase signal PSIG, which fixes the operating frequency as well.

In addition, the architecture of the present invention is simpler than the conventional DC-DC switching regulator. As can be seen from the above, the DC-DC switching regulator 20 needs to sample and hold the PWM signal generated by the constant time trigger circuit 204, and if the operating period exceeds the predefined value, the turn-on period Ton is adjusted to fix the operating frequency. In order to implement the architecture of the prior art, the circuit at least needs to include an operational transconductance amplifier (OTA) and a large on-chip capacitor to realize error integration function. In comparison, the present invention only needs a compact circuit to realize the constant frequency compensating circuit, for substantially fixing the operating frequency. The present invention only needs about 20% of the chip area of the prior art according to experimental results. Besides, if the load current Iout3 is within 20 A, Vout3=1.5V, Rds1=9 mΩ, and Rds2=4 mΩ, the operating frequency can be fixed within less than 5% variation according to experiment results.

The present invention regulates the operating frequency of the DC-DC switching regulator to a substantially fixed value, such that the design of the frequency-sensitive components of the DC-DC switching regulator becomes much simpler, and the output ripples are effectively reduced. To sum up, the present invention discloses a method for adjusting the turn-on period of the constant time trigger circuit according to the output voltage and the voltage across the lower gate switch (the phase signal). The present invention further discloses a compact circuit to alter charging time, such that the turn-on period can be effectively adjusted, so as to fix the operating frequency within a range. According to the experimental results, the present invention has excellent performance and effectively saves cost.

Those skilled in the art will readily observe that numerous modifications and alterations of the device and method may be made while retaining the teachings of the invention.

What is claimed is:

1. A switching regulator for fixing an operating frequency comprising:
   a power stage circuit, for receiving an input voltage, and providing an output voltage according to a control signal, comprising:
      an upper gate switch;
      a lower gate switch, coupled to the upper gate switch; and
      an inductor, coupled to the upper gate switch and the lower gate switch;
   a reference voltage generator, for generating a reference voltage;
   a comparator, for outputting a comparison result according to the output voltage and the reference voltage; and
   a constant frequency compensating circuit, for outputting the control signal according to the comparison result, a phase signal and a compensating signal, comprising a charging capacitor having one terminal coupled to a ground, for charging;
   wherein the phase signal is corresponding to a voltage across the lower gate switch of the power stage circuit, the compensating signal is corresponding to the output voltage of the power stage circuit, and the constant frequency compensating circuit utilizes the phase signal to initialize a voltage of another terminal of the charging capacitor of the constant frequency compensating circuit.

2. The switching regulator of claim 1 further comprising a capacitor coupled to the inductor, wherein a voltage across the capacitor equals the output voltage.

3. The switching regulator of claim 1 further comprising a load coupled to the power stage circuit.

4. The switching regulator of claim 1, wherein the upper gate switch and the lower gate switch are metal oxide semiconductor field effect transistors.

5. The switching regulator of claim 1, wherein the constant frequency compensating circuit further comprises:
   a reference current source, coupled to the another terminal of the charging capacitor, for providing a constant current related to the input voltage to charge the charging capacitor;
   a comparator, comprising a positive terminal, for receiving the compensating signal, and a negative terminal, coupled to the other terminal of the charging capacitor, the comparator utilized for comparing magnitudes of signals of the positive terminal and the negative terminal, to output the control signal; and
   a switch, comprising a first terminal, coupled to the another terminal of the charging capacitor, and a second terminal, for receiving the phase signal, the switch utilized for conducting connection between the first and the second terminals according to the control signal.

6. A constant frequency compensating circuit for a switching regulator comprising:
   a charging capacitor, having one terminal coupled to a ground, for charging;
   a reference current source, coupled to another terminal of the charging capacitor, for providing a constant current related to an input voltage of the switching regulator to charge the charging capacitor;
   a comparator, comprising a positive terminal, for receiving a compensating signal, and a negative terminal, coupled to the another terminal of the charging capacitor, the comparator utilized for comparing magnitudes of signals of the positive terminal and the negative terminal, to output a control signal; and
   a switch, comprising a first terminal, coupled to the another terminal of the charging capacitor, and a second terminal, for receiving a phase signal, the switch utilized for conducting connection between the first and the second terminals according to the control signal;
   wherein the phase signal is corresponding to a voltage across a lower gate switch of the switching regulator, the compensating signal is corresponding to an output voltage of the switching regulator, and the constant frequency compensating circuit utilizes the phase signal to initialize a voltage of the another terminal of the charging capacitor of the constant frequency compensating circuit.

* * * * *